(12) United States Patent
Albero et al.

(10) Patent No.: US 12,556,578 B2
(45) Date of Patent: Feb. 17, 2026

(54) SYSTEM AND METHOD FOR DETERMINING AND PREVENTING MALFEASANT ACTIVITY IN A PRIVATE DISTRIBUTED NETWORK

(71) Applicant: BANK OF AMERICA CORPORATION, Charlotte, NC (US)

(72) Inventors: George Anthony Albero, Charlotte, NC (US); Maharaj Mukherjee, Poughkeepsie, NY (US); Prashant Thakur, Gujarat (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 153 days.

(21) Appl. No.: 18/381,839

(22) Filed: Oct. 19, 2023

(65) Prior Publication Data

US 2025/0133113 A1    Apr. 24, 2025

(51) Int. Cl.
*H04L 9/40* (2022.01)

(52) U.S. Cl.
CPC ...... *H04L 63/1491* (2013.01); *H04L 63/1416* (2013.01)

(58) Field of Classification Search
CPC .............. H04L 63/1491; H04L 63/1416; H04L 63/1425
See application file for complete search history.

(56) References Cited

U.S. PATENT DOCUMENTS

| | | | |
|---|---|---|---|
| 2019/0027237 A1* | 1/2019 | McFarlane | G16H 80/00 |
| 2020/0342452 A1* | 10/2020 | Diamond | G06Q 20/3674 |
| 2020/0394651 A1* | 12/2020 | Kreder, III | G06Q 20/22 |
| 2021/0192651 A1* | 6/2021 | Groth | G06Q 30/0206 |
| 2022/0103584 A1* | 3/2022 | Tobin | H04L 63/0236 |
| 2022/0318796 A1* | 10/2022 | Zhou | G06Q 20/3827 |
| 2023/0007035 A1* | 1/2023 | Leporini | H04L 9/3239 |
| 2024/0370872 A1* | 11/2024 | Kennedy | G06Q 30/0641 |

OTHER PUBLICATIONS

Ledger Academy. "How to Read a Blockchain's Transaction History" Published Sep. 11, 2020 (6 pages) https://web.archive.org/web/20201224063350/https://www.ledger.com/academy/how-to-read-a-blockchains-transaction-history (Year: 2020).*

* cited by examiner

*Primary Examiner* — Thomas A Gyorfi
(74) *Attorney, Agent, or Firm* — Moore & Van Allen PLLC; Nicholas C. Russell

(57) ABSTRACT

Systems, computer program products, and methods for determining and preventing malfeasant activity in a private distributed network. The method includes generating one or more executed data transfer records for each of one or more executed data transfers across a distributed network. Each of the one or more executed data transfer records includes one or more data transfer information fields. The method also includes generating one or more decoy executed data transfer records. The decoy executed data transfer record(s) includes the data transfer information field(s). The method further includes providing a portal that contains each of the records associated with the distributed network. The method still further includes detecting a record access for one or more of the decoy executed data transfer records by an end-point device associated with a user. The method also includes causing an escalation action to be executed based on the detection of the record access.

17 Claims, 8 Drawing Sheets

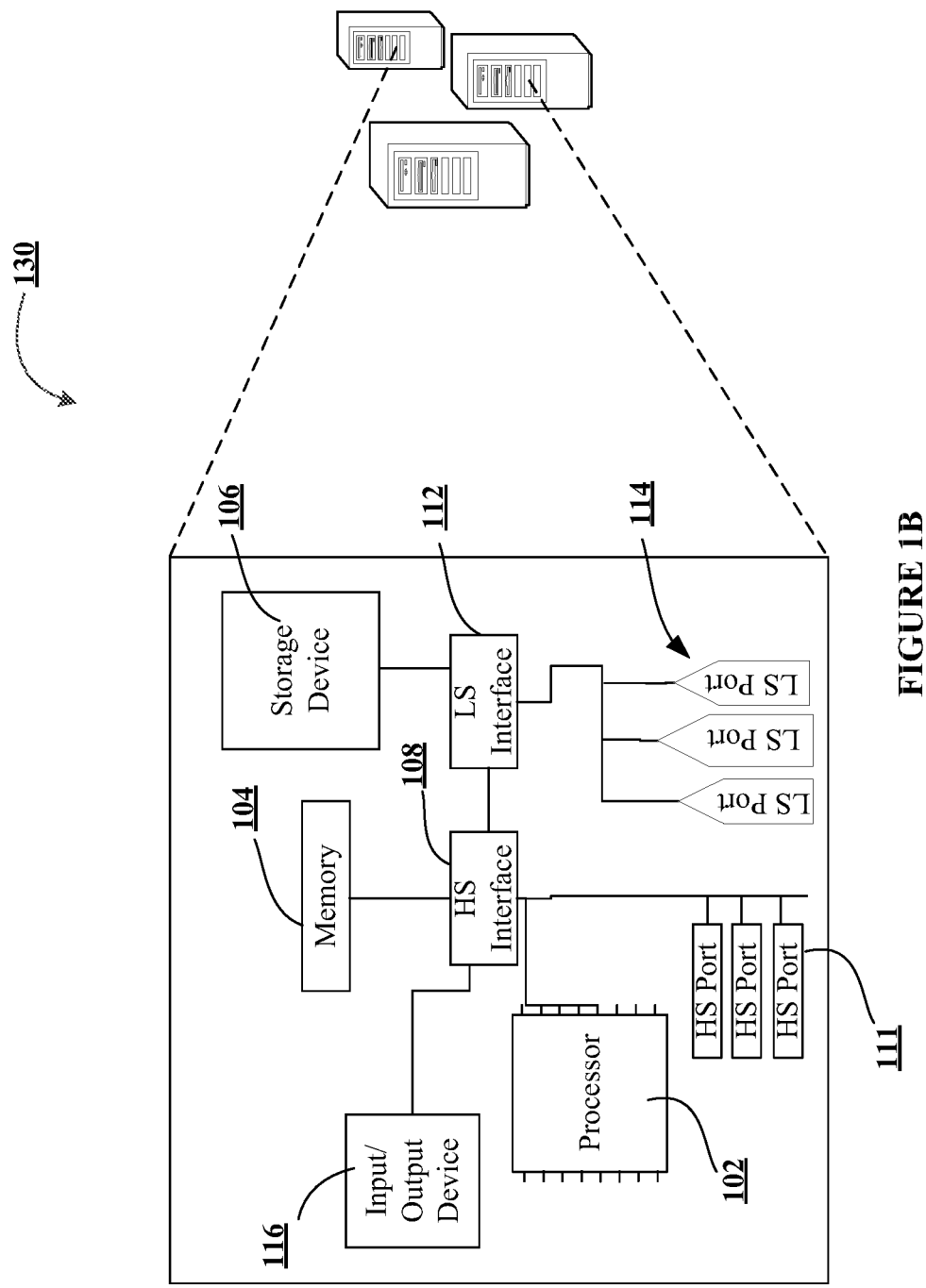

SYSTEM AND METHOD FOR DETERMINING AND PREVENTING MALFEASANT ACTIVITY IN A PRIVATE DISTRIBUTED NETWORK

TECHNOLOGICAL FIELD

Example embodiments of the present disclosure relate generally to security in a private distributed network and, more particularly, to determining and preventing malfeasant activity in a private distributed network.

BACKGROUND

Distributed networks allow for transparency of data transfers. However, such transparency may be used to carry out malfeasant activity by users that may use information available on the distributed network to intercept or otherwise interfere with data transfers. Distributed networks often have many users, such that managing user access in a private distributed network can be difficult. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present disclosure, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

In an example embodiment, a system for determining and preventing malfeasant activity in a private distributed network is provided. The system includes at least one non-transitory storage device containing instructions and at least one processing device coupled to the at least one non-transitory storage device. The at least one processing device, upon execution of the instructions, is configured to generate one or more executed data transfer records for each of one or more executed data transfers across a distributed network. Each of the one or more executed data transfer records includes one or more data transfer information fields. The at least one processing device, upon execution of the instructions, is also configured to generate one or more decoy executed data transfer records associated with one or more decoy data transfers. The one or more decoy executed data transfer records includes the one or more data transfer information fields. The at least one processing device, upon execution of the instructions, is further configured to provide a portal that contains each of the one or more executed data transfer records and the one or more decoy executed data transfer records associated with the distributed network. The at least one processing device, upon execution of the instructions, is still further configured to detect a record access for one or more of the decoy executed data transfer records by an end-point device associated with a user on the distributed network. The at least one processing device, upon execution of the instructions, is also configured to cause an escalation action to be executed based on the detection of the record access. The escalation action includes limiting access to the distributed network for the user.

In various embodiments, the at least one processing device, upon execution of the instructions, is also configured to determine one or more viewed records of at least one of the one or more executed data transfer records or one or more decoy executed data transfer records by the end-point device associated with the user and cause the one or more viewed records to be marked as a potential target of malfeasance.

In various embodiments, the at least one processing device, upon execution of the instructions, is also configured to determine a malfeasant action has occurred on one or more of the one or more viewed records and the escalation action includes a remediation action on the one or more of the one or more viewed on which a malfeasant action has occurred.

In various embodiments, the at least one processing device, upon execution of the instructions, is also configured to determine a malfeasant intent for the user based on an interaction type for the record access and determine the escalation action based on the malfeasant intent.

In various embodiments, the at least one processing device, upon execution of the instructions, is also configured to detect a physical tampering of a server associated with the distributed network with the escalation action including a shutdown of the distributed network in an instance in which the physical tampering is detected.

In various embodiments, the escalation action includes causing one or more data transfers on a distributed network to be denied in an instance in which at least one of physical tampering or a record access occurs.

In various embodiments, the distributed network is a private distributed network, wherein one or more entities can limit access to one or more users on the private distributed network.

In another example embodiment, a computer program product for determining and preventing malfeasant activity in a private distributed network is provided. The computer program product includes at least one non-transitory computer-readable medium having computer-readable program code portions embodied therein. The computer-readable program code portions include one or more executable portions configured to generate one or more executed data transfer records for each of one or more executed data transfers across a distributed network. Each of the one or more executed data transfer records includes one or more data transfer information fields. The computer-readable program code portions include one or more executable portions also configured to generate one or more decoy executed data transfer records associated with one or more decoy data transfers. The one or more decoy executed data transfer records includes the one or more data transfer information fields. The computer-readable program code portions include one or more executable portions further configured to provide a portal that contains each of the one or more executed data transfer records and the one or more decoy executed data transfer records associated with the distributed network. The computer-readable program code portions include one or more executable portions still further configured to detect a record access for one or more of the decoy executed data transfer records by an end-point device associated with a user on the distributed network. The computer-readable program code portions include one or more executable portions also configured to cause an escalation action to be executed based on the detection of the record access. The escalation action includes limiting access to the distributed network for the user.

In various embodiments, the computer-readable program code portions include one or more executable portions also configured to determine one or more viewed records of at least one of the one or more executed data transfer records or one or more decoy executed data transfer records by the end-point device associated with the user and cause the one or more viewed records to be marked as a potential target of malfeasance.

In various embodiments, the computer-readable program code portions include one or more executable portions also configured to determine a malfeasant action has occurred on one or more of the one or more viewed records with the escalation action including a remediation action on the one or more of the one or more viewed on which a malfeasant action has occurred.

In various embodiments, the computer-readable program code portions include one or more executable portions also configured to determine a malfeasant intent for the user based on an interaction type for the record access and determine the escalation action based on the malfeasant intent.

In various embodiments, the computer-readable program code portions include one or more executable portions also configured to detect a physical tampering of a server associated with the distributed network with the escalation action including a shutdown of the distributed network in an instance in which the physical tampering is detected.

In various embodiments, the escalation action includes causing one or more data transfers on a distributed network to be denied in an instance in which at least one of physical tampering or a record access occurs.

In various embodiments, the distributed network is a private distributed network, wherein one or more entities can limit access to one or more users on the private distributed network.

In still another example embodiment, a method for determining and preventing malfeasant activity in a private distributed network is provided. The method includes generating one or more executed data transfer records for each of one or more executed data transfers across a distributed network. Each of the one or more executed data transfer records includes one or more data transfer information fields. The method also includes generating one or more decoy executed data transfer records associated with one or more decoy data transfers. The one or more decoy executed data transfer records includes the one or more data transfer information fields. The method further includes providing a portal that contains each of the one or more executed data transfer records and the one or more decoy executed data transfer records associated with the distributed network. The method still further includes detecting a record access for one or more of the decoy executed data transfer records by an end-point device associated with a user on the distributed network. The method also includes causing an escalation action to be executed based on the detection of the record access. The escalation action includes limiting access to the distributed network for the user.

In various embodiments, the method also includes determining one or more viewed records of at least one of the one or more executed data transfer records or one or more decoy executed data transfer records by the end-point device associated with the user, causing the one or more viewed records to be marked as a potential target of malfeasance, and determining a malfeasant action has occurred on one or more of the one or more viewed records with the escalation action including a remediation action on the one or more of the one or more viewed on which a malfeasant action has occurred.

In various embodiments, the method also includes determining a malfeasant intent for the user based on an interaction type for the record access and determining the escalation action based on the malfeasant intent.

In various embodiments, the method also includes detecting a physical tampering of a server associated with the distributed network with the escalation action including a shutdown of the distributed network in an instance in which the physical tampering is detected.

In various embodiments, the escalation action includes causing one or more data transfers on a distributed network to be denied in an instance in which at least one of physical tampering or a record access occurs.

In various embodiments, the distributed network is a private distributed network with the one or more entities can limit access to one or more users on the private distributed network.

The features, functions, and advantages that have been discussed may be achieved independently in various embodiments of the present disclosure or may be combined with yet other embodiments, further details of which can be seen with reference to the following description and drawings.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

FIGS. 1A-1C illustrate technical components of an exemplary distributed computing environment for determining and preventing malfeasant activity in a private distributed network, in accordance with various embodiments of the present disclosure;

DETAILED DESCRIPTION

Figure 1A:
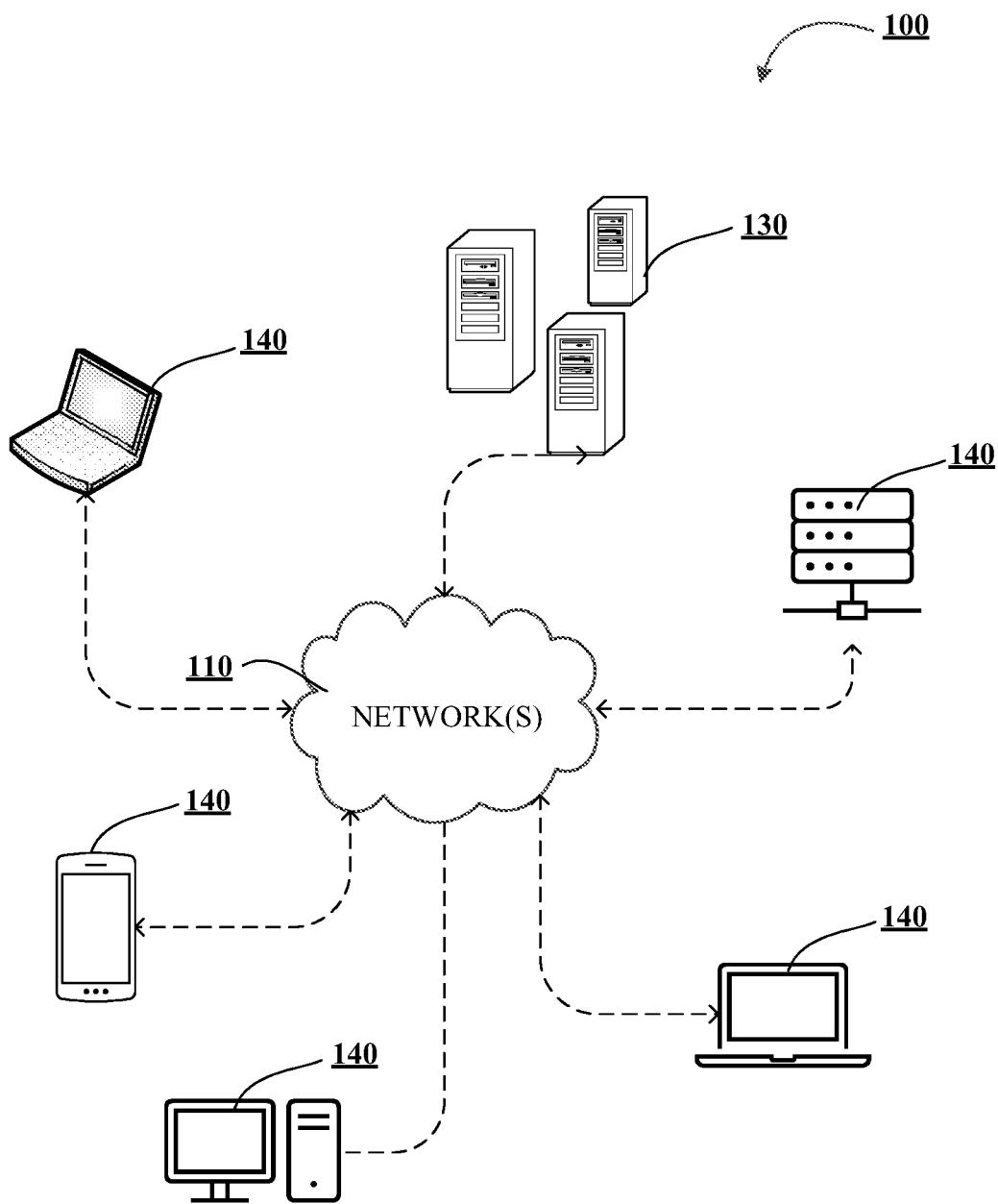

Embodiments of the present disclosure will now be described more fully hereinafter with reference to the accompanying drawings, in which some, but not all, embodiments of the disclosure are shown. Indeed, the various inventions may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers, or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Distributed networks allow for transparency of data transfers. However, such transparency may be used to carry out malfeasant activity by users that may use information available on the distributed network to intercept or otherwise interfere with data transfers. Distributed networks often have many users, such that managing user access in a private distributed network can be difficult.

Private distributed networks (e.g., private distributed ledgers) are controlled by one or more entities that can control access to the distributed network. However, distributed networks with large number of data transfer can be difficult for the controlling entities to monitor for potentially malfeasant activity. As such, the transparency allowed by distributed ledgers can be detrimental to overall security. Malfeasant actors may access records relating to data transfers to obtain information to intercept or otherwise tamper with the given data transfer and/or future data transfer. For example, malfeasant actors may obtain routing information, data information, and/or the like that allows for a data transfer (e.g., a resource transfer) to be intercepted. However, such actions are difficult to detect, as the records are available to users on the private distributed network, even users not involved in the data transfer.

Various embodiments of the present disclosure allow for determining and preventing malfeasant activity in a private distributed network. To do this, the system generates decoy executed data transfer records that are associated with one or more decoy data transfers. The decoy executed data transfer records include the same type of information typically included in an executed data transfer record (e.g., one or more data transfer information fields, such as sender, recipient, routing information, etc.). As such, the decoy executed data transfer record(s) appear to be associated with an actual data transfer. However, since the decoy executed data transfer record(s) are associated with nonexistent data transfers, there is generally no reason except for accident or malfeasant intent for a user on the distributed network to access a decoy executed data transfer record. An access record is generated for any access by a user of the decoy executed data transfer record and the user may then be monitored or otherwise limited on the distributed network. For example, a user that accesses one or more decoy executed data transfer records may be flagged as a potential malfeasant actor and have access to the distributed network limited or eliminated. In various embodiments, repeated record access by the same user of multiple decoy executed data transfer records may also indicate malfeasant intent.

In various embodiments, the system may also monitor the actual server(s) associated with the distributed network for physical tampering. Such physical tampering may indicate that the distributed network is be attacked or otherwise targeted.

Figure 1C:
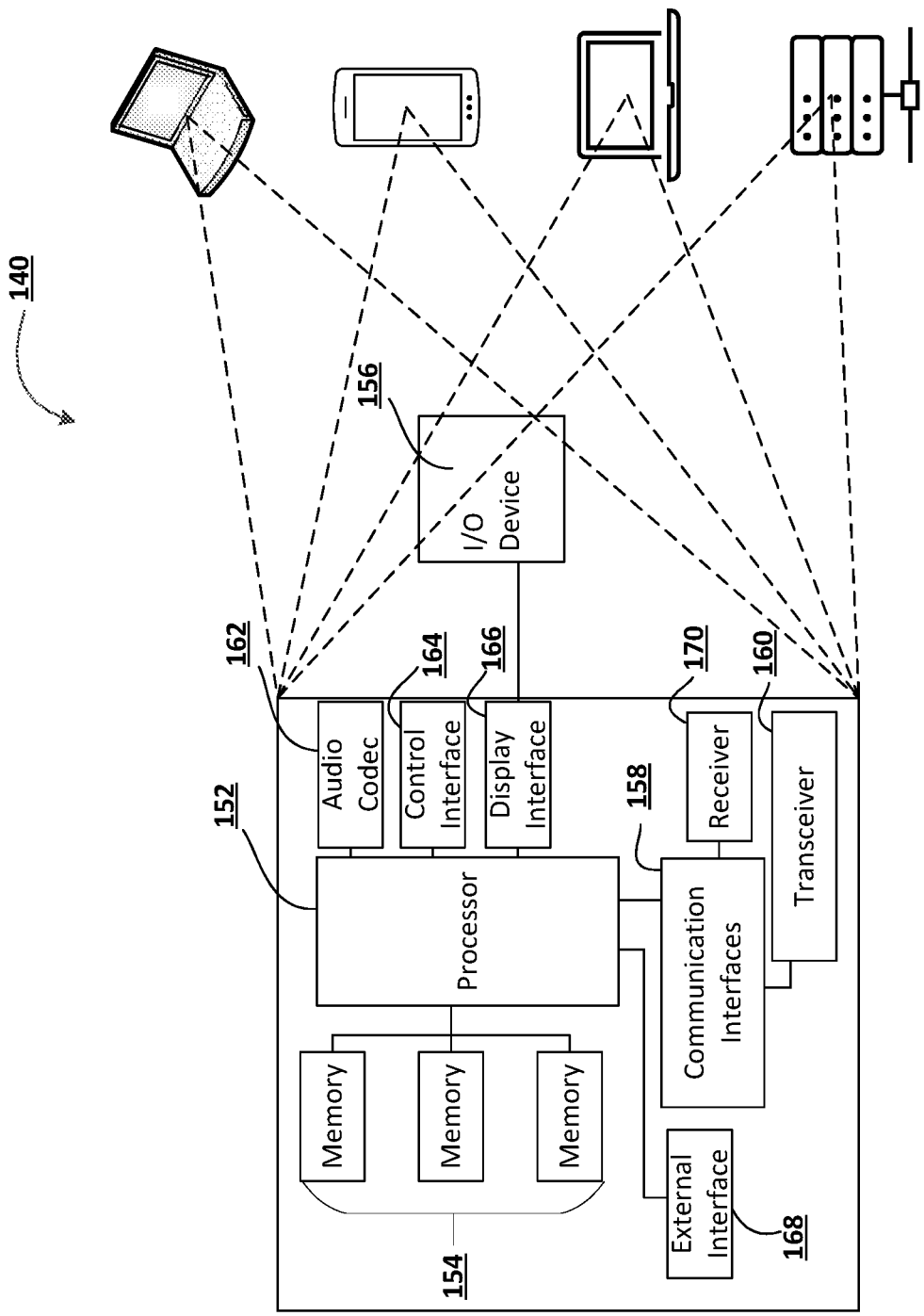

FIGS. 1A-1C illustrate technical components of an example distributed computing environment for determining and preventing malfeasant activity in a private distributed network, in accordance with various embodiments of the disclosure. As shown in FIG. 1A, the distributed computing environment 100 contemplated herein may include a system 130 (e.g., a node failure detection device), an end-point device(s) 140, and one or more networks 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network(s) 110. Instead of having a central server (e.g., system 130) which would act as the shared drive, each device that is connect to the network(s) 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network(s) 110 may be a distributed network that is spread over different networks. This provides a single data communication network, which can be managed jointly or separately by each network. Besides shared communication within the network, the distributed network often also supports distributed processing. The network(s) 110 may be a form of digital communication network such as a telecommunication network, a local area network ("LAN"), a wide area network ("WAN"), a global area network ("GAN"), the Internet, satellite network, cellular network, and/or any combination of the foregoing. The network(s) 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosure described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low-speed expansion port 114 (shown as "LS Port") and storage device 106. Each of the components 102, 104, 106 108, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions.

The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interfaces 158, and a transceiver 160, among other components. The end-point device(s) 140 may also be provided with a storage device, such as a micro-drive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single in Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network(s) 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process)

with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through at least one of communication interfaces 158, which may include digital signal processing circuitry where necessary. Communication interfaces 158 may provide for communications under various modes or protocols, such as the Internet Protocol (IP) suite (commonly known as TCP/IP). Protocols in the IP suite define end-to-end data handling methods for everything from packetizing, addressing, and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interfaces 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130. The end-point device(s) 140 may include a communication interface that is configured to operate with a satellite network.

In various embodiments, the end-point device(s) 140 may have multiple communication interfaces that are configured to operate using the various communication methods discussed herein. For example, an end-point device 140 may have a cellular network communication interface (e.g., a communication interface that provides for communication under various telecommunications standards) and a satellite network communication interface (e.g., a communication interface that provides for communication via a satellite network). Various other communication interfaces may also be provided by the end-point device (e.g., an end-point device may be capable of communicating via a cellular network, a satellite network, and/or a wi-fi connection). Various communication interfaces may share components with other communication interfaces in the given end-point device.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

Figure 2:
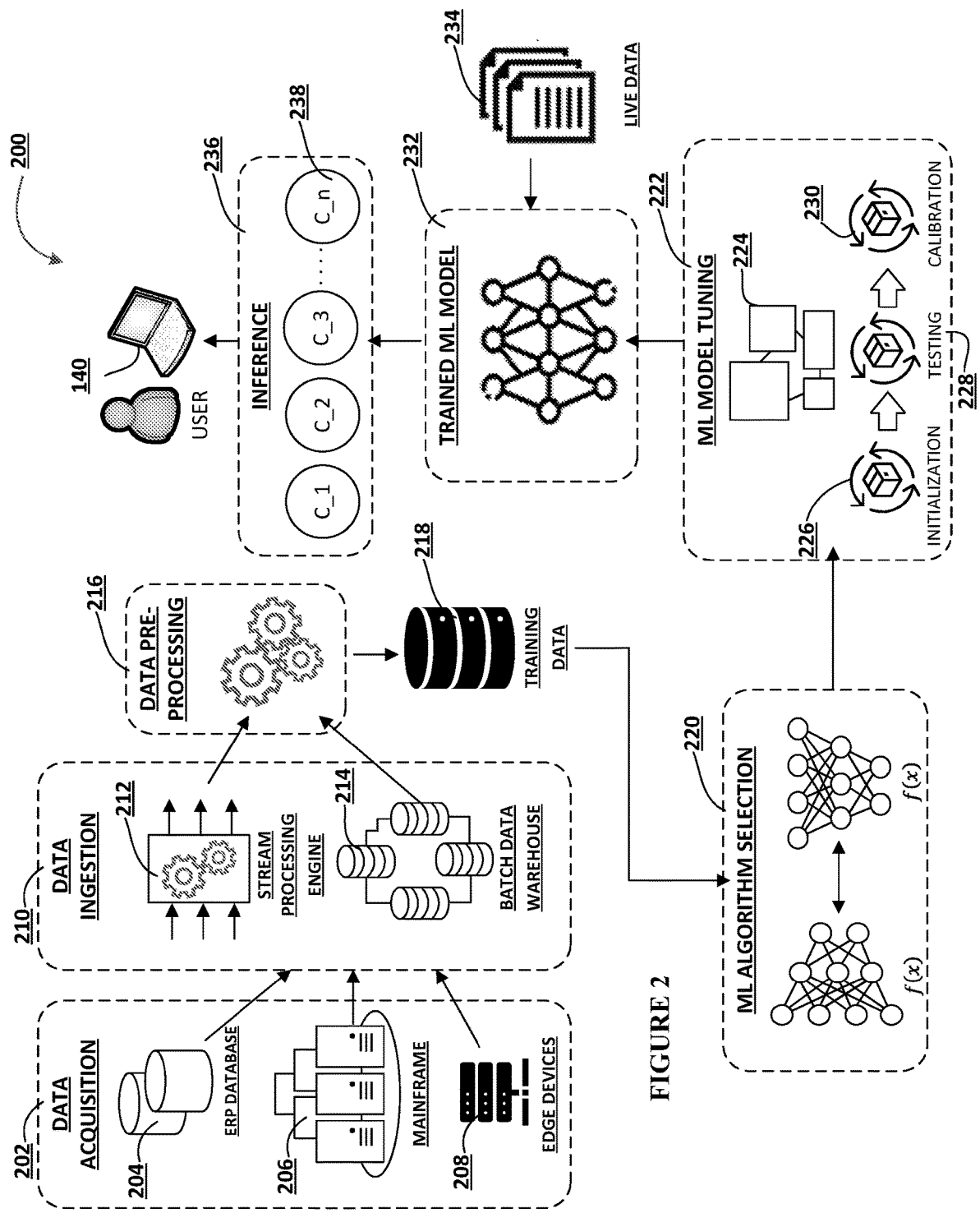
FIG. 2 illustrates an example machine learning (ML) subsystem architecture used to determine and prevent malfeasant activity in a private distributed network, in accordance with various embodiments of the present disclosure.

FIG. 2 illustrates an example machine learning (ML) architecture 200, in accordance with an embodiment of the present disclosure. The ML subsystem architecture may be part of the components of the environment 100 (e.g., system 130). The ML subsystem architecture is used to determine and prevent malfeasant activity in a private distributed network as discussed below in reference to FIGS. 4A and 4B. Namely, the ML subsystem architecture may be used to train the system to generate decoy executed data transfer records and/or monitor the distributed network for record access of decoy executed data transfer records.

The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 210, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1, C\_2 \ldots C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1, C\_2 \ldots C\_n$ 238) live data 234 based on how similar they are to one another to solve exploratory challenges where little is known about the data, provide a description or label (e.g., $C\_1, C\_2 \ldots C\_n$ 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is example and that other embodiments may vary. As another example, in some embodiments, the machine learning subsystem 200 may include more, fewer, or different components.

Figure 3A:
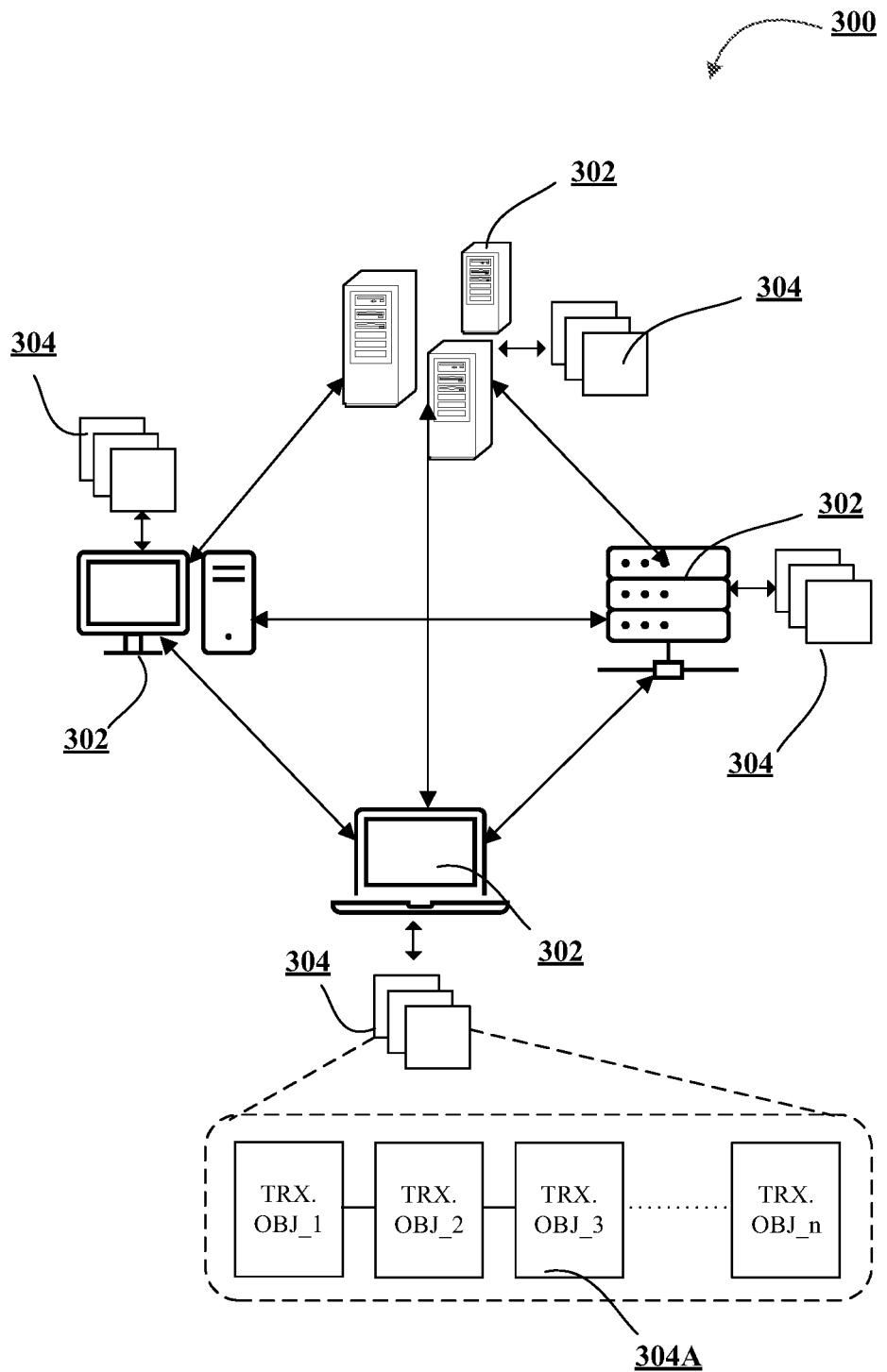
FIGS. 3A-3B illustrate an example distributed ledger technology (DLT) architecture, in accordance with various embodiments of the present disclosure.
Figure 3B:
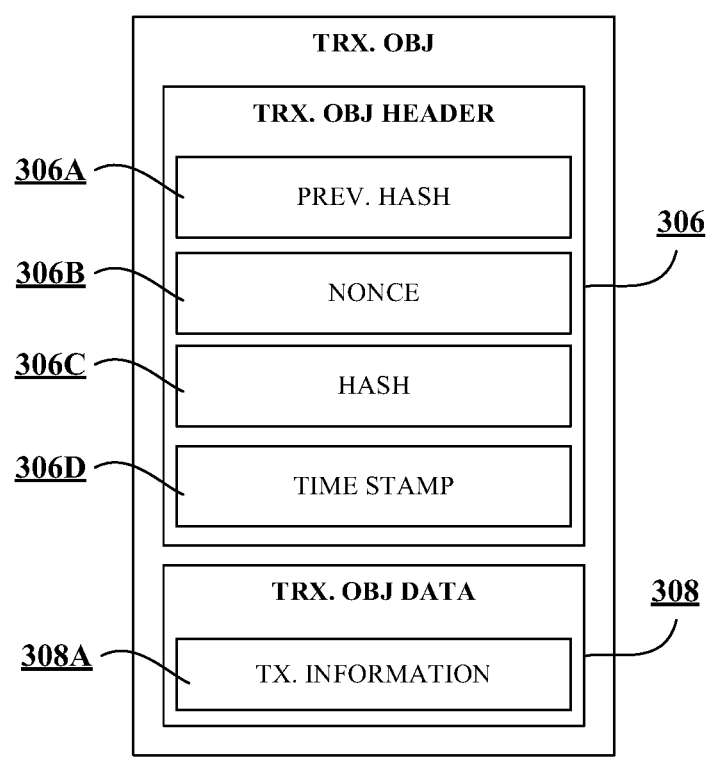

FIGS. 3A-3B illustrate an example distributed ledger technology (DLT) architecture, in accordance with various embodiments of the present disclosure. DLT may refer to the protocols and supporting infrastructure that allow computing devices (peers) in different locations to propose and validate transactions and update records in a synchronized way across a network. Accordingly, DLT is based on a decentralized model, in which these peers collaborate and build trust over the network. To this end, DLT involves the use of potentially peer-to-peer protocol for a cryptographically secured distributed ledger of transactions represented as transaction objects that are linked. As transaction objects each contain information about the transaction object previous to it, they are linked with each additional transaction object, reinforcing the ones before it. Therefore, distributed ledgers are resistant to modification of their data because once recorded, the data in any given transaction object cannot be altered retroactively without altering all subsequent transaction objects.

To permit transactions and agreements to be carried out among various peers without the need for a central authority or external enforcement mechanism, DLT uses smart contracts. Smart contracts are computer code that automatically executes all or parts of an agreement and is stored on a DLT platform. The code can either be the sole manifestation of the agreement between the parties or might complement a traditional text-based contract and execute certain provisions, such as transferring funds from Party A to Party B. The code itself is replicated across multiple nodes (peers) and, therefore, benefits from the security, permanence, and immutability that a distributed ledger offers. That replication also means that as each new transaction object is added to the distributed ledger, the code is, in effect, executed. If the parties have indicated, by initiating a transaction, that certain parameters have been met, the code will execute the step triggered by those parameters. If no such transaction has been initiated, the code will not take any steps.

Various other specific-purpose implementations of distributed ledgers have been developed. These include distributed domain name management, decentralized crowd-funding, synchronous/asynchronous communication, decentralized real-time ride sharing and even a general-purpose deployment of decentralized applications. In some embodiments, a distributed ledger may be characterized as a public distributed ledger, a consortium distributed ledger, or a private distributed ledger. A public distributed ledger is a distributed ledger that anyone in the world can read, anyone in the world can send transactions to and expect to see them included if they are valid, and anyone in the world can participate in the consensus process for determining which transaction objects get added to the distributed ledger and what the current state each transaction object is. A public distributed ledger is generally considered to be fully decentralized. On the other hand, fully private distributed ledger is a distributed ledger whereby permissions are kept centralized with one entity. The permissions may be public or restricted to an arbitrary extent. And lastly, a consortium distributed ledger is a distributed ledger where the consensus process is controlled by a pre-selected set of nodes; for example, a distributed ledger may be associated with a number of member institutions (say 15), each of which operate in such a way that the at least 10 members must sign every transaction object in order for the transaction object to be valid. The right to read such a distributed ledger may be public or restricted to the participants. These distributed ledgers may be considered partially decentralized.

As shown in FIG. 3A, the exemplary DLT architecture 300 includes a distributed ledger 304 being maintained on multiple devices (nodes) 302 that are authorized to keep track of the distributed ledger 304. For example, these nodes 302 may be computing devices such as system 130 and client device(s) 140. One node 302 in the DLT architecture 300 may have a complete or partial copy of the entire distributed ledger 304 or set of transactions and/or transaction objects 304A on the distributed ledger 304. Transactions are initiated at a node and communicated to the various nodes in the DLT architecture. Any of the nodes can validate a transaction, record the transaction to its copy of the distributed ledger, and/or broadcast the transaction, its validation (in the form of a transaction object) and/or other data to other nodes.

As shown in FIG. 3B, an exemplary transaction object 304A may include a transaction header 306 and a transaction object data 308. The transaction header 306 may include a cryptographic hash of the previous transaction object 306A, a nonce 306B-a randomly generated 32-bit whole number when the transaction object is created, cryptographic hash of the current transaction object 306C wedded to the nonce 306B, and a time stamp 306D. The transaction object data 308 may include transaction information 308A being recorded. Once the transaction object 304A is generated, the transaction information 308A is considered signed and forever tied to its nonce 306B and hash 306C. Once generated, the transaction object 304A is then deployed on the distributed ledger 304. At this time, a distributed ledger address is generated for the transaction object 304A, i.e., an indication of where it is located on the distributed ledger 304 and captured for recording purposes. Once deployed, the transaction information 308A is considered recorded in the distributed ledger 304.

Figure 4A:
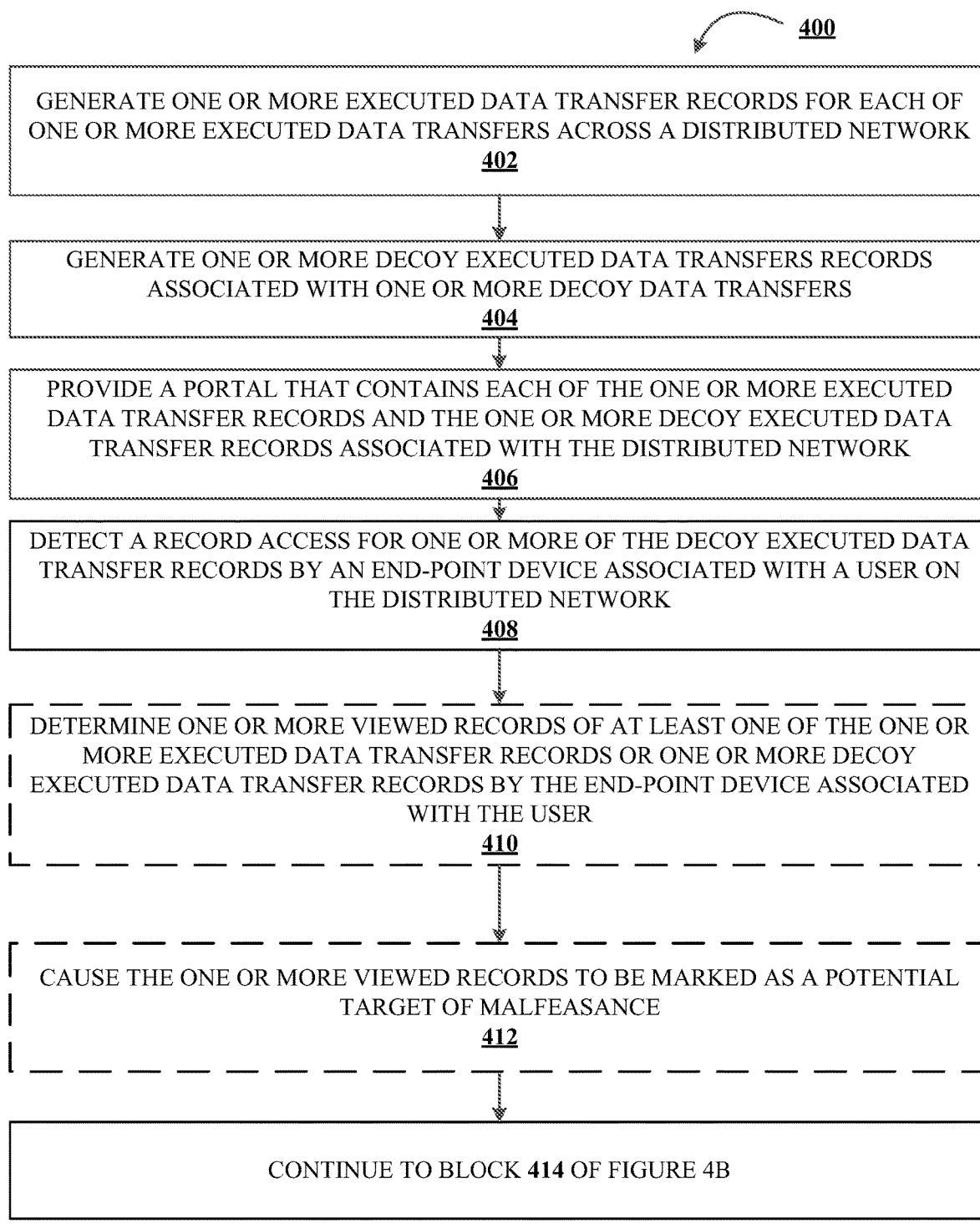
FIGS. 4A and 4B illustrate a process flow for determining and preventing malfeasant activity in a private distributed network, in accordance with various embodiments of the present disclosure.
Figure 4B:
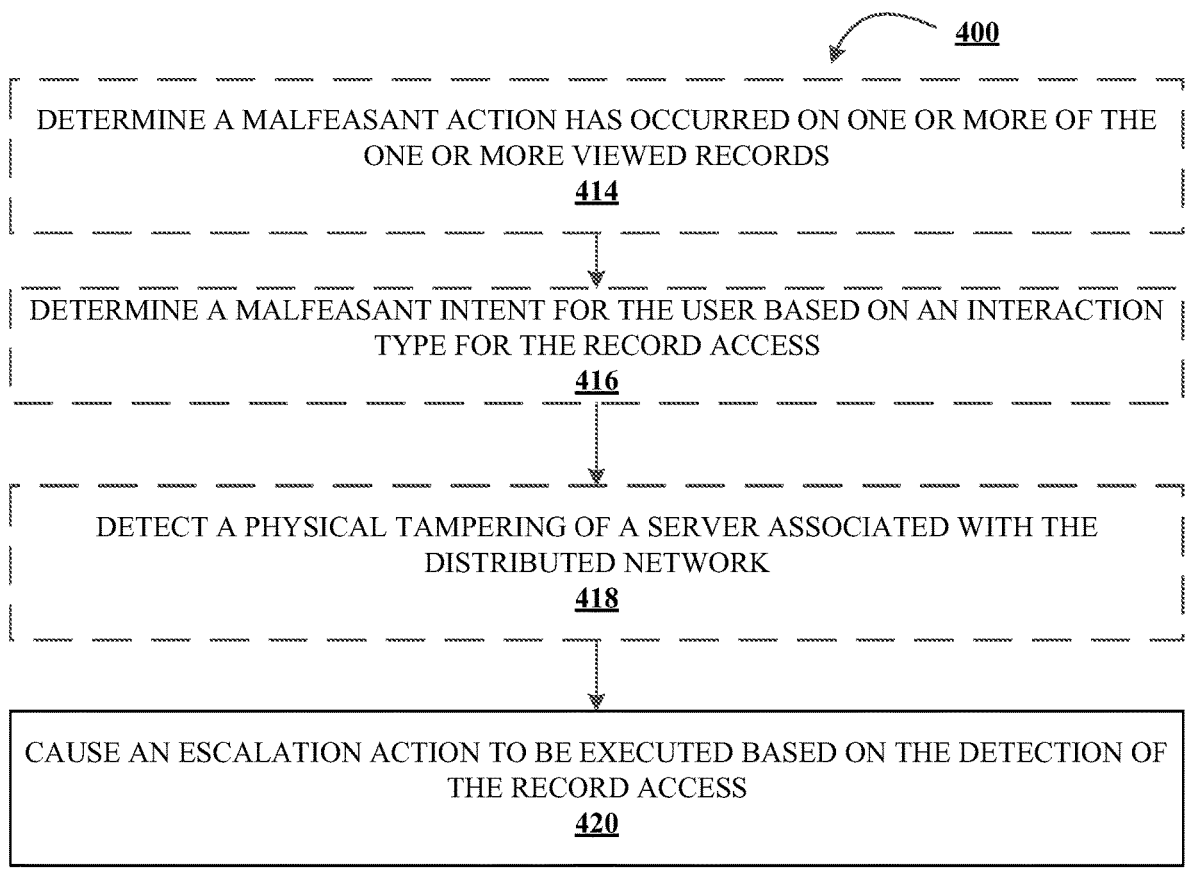

FIGS. 4A and 4B include a flow chart 400 that illustrates an example method for determining and preventing malfeasant activity in a private distributed network. The method may be carried out by various components of the distributed computing environment 100 discussed herein (e.g., the system 130, one or more end-point devices 140, etc.). An example system may include at least one non-transitory storage device and at least one processing device coupled to the at least one non-transitory storage device. In such an embodiment, the at least one processing device is configured to carry out the method discussed herein. A method of various embodiments may include any combination or subset of the features discussed herein.

Various operations of the flow chart 400 may be carried out using the ML/AI model(s) shown and discussed in reference to FIG. 2 above. Additionally, the operations may be carried out on a distributed network (e.g., a distributed ledger) discussed above in reference to FIGS. 3A and 3B. In various embodiments, the distributed network may be a private distributed network (e.g., a private distributed ledger) that is controlled by one or more entities. As such, the one or more entities may be capable of limiting user access to the distributed network.

Referring now to Block 402 of FIG. 4A, the method includes generating one or more executed data transfer records for each of one or more executed data transfers across a distributed network. The executed data transfer may be a resource transfer. The executed data transfer may be in the form of a smart contract.

The distributed network may be a private distributed network, such as a private distributed ledger. As such, one or more entities may control access for one or more users on the distributed network.

In various embodiments, the executed data transfer record may be generated during the execution of the executed data transfer. For example, the executed data transfer record may include information relating to the status of the data transfer. In various embodiments, the executed data transfer record may be generated after the data transfer has been executed.

In various embodiments, each executed data transfer record may include one or more data transfer information fields relating to the data transfer. Example data transfer information fields includes transfer sender, transfer recipient, data transfer type, resource type, data transfer time (e.g., time of request and/or time of execution of the data transfer), routing information for one or more users associated with the data transfer, and/or the like.

Referring now to Block 404 of FIG. 4A, the method includes generating one or more decoy executed data transfer records associated with one or more decoy data transfers. The decoy data transfers are data transfers that did not occur. In various embodiments, the decoy data transfer may be completely fabricated (e.g., the information in the decoy executed data transfer record may be created specifically for the decoy data transfer). Additionally or alternatively, the decoy data transfer may be based on actual data transfers and/or actual information relating to the distributed network. For example, the decoy data transfer may be a fabricated data transfer between two actual users on the distributed network.

In various embodiments, the one or more decoy executed data transfer records may be configured to appear as an executed data transfer record. For example, the decoy executed data transfer records may have one or more data transfer information fields that are the same as the one or more data transfer information fields in the executed data transfer records. As such, the decoy executed data transfer may be in the form of a smart contract. In various embodiments, the term "record" used herein may refer to either an executed data transfer record or a decoy executed data transfer record.

In various embodiments, the one or more decoy executed data transfer records associated with one or more decoy data transfers are generated via machine learning model(s) and/or AI model(s) (ML/AI model(s)). In various embodiments, the method may use any of the components of the ML architecture 200 shown and discussed above in reference to FIG. 2 to train and/or update the ML/AI model(s). In various embodiments, the ML/AI model(s) may be trained using executed data transfer records. In various embodiments, the ML/AI model(s) may also be used in other operations herein.

Referring now to Block 406 of FIG. 4A, the method includes providing a portal that contains each of the one or more executed data transfer records and the one or more decoy executed data transfer records associated with the distributed network. In various embodiments, the distributed network may have a portal that include each of the executed data transfer record(s) and the decoy executed data transfer record(s). The portal may have one or more pages associated with each of the executed data transfer record(s) and the decoy executed data transfer record(s). The given pages may include various information relating to the given data transfer. For example, the values of the includes the data transfer information field(s) for each record may be viewed via the portal. The portal may be searchable and/or otherwise navigable between different records associated with the distributed network (e.g., between the various executed data transfer record(s) and/or decoy executed data transfer record(s)).

In various embodiments, the portal may be any visual representation relating to the distributed network rendered on a user interface of an end-point device associated with one or more users on the distributed network. The portal may be viewable by one or more users on the distributed network. The portal may include one or more viewable records associated with data transfer on the distributed network. The records viewable on the portal may be stored on one or more servers associated with the distributed network.

Referring now to Block 408 of FIG. 4A, the method includes detecting a record access for one or more of the decoy executed data transfer records by an end-point device associated with a user on the distributed network. In various embodiments, the decoy data transfer records and/or the executed data transfer records may be monitored for access by users. A record access may be registered for any access of the given record. In various embodiments, the system may monitor all record accesses on the distributed network (e.g., across both decoy data transfer record(s) and executed data transfer record(s)). Alternatively, the system may monitor decoy data transfer record(s) for record access. For example, the detection of a record access of one or more of the decoy executed data transfer record(s), may trigger additional review of other record access (e.g., the system may determine executed data transfer records that were also viewed by the same user as the record access of the one or more of the decoy executed data transfer record(s)).

An access of the given record may be an instance in which an end-point device associated with a user views a rendered page that includes the information of the decoy data transfer record or the executed data transfer record. An access may require an active engagement to access the given record. For example, a user may have to engage the given record (e.g., click on a link) and/or provide record information to access the record (e.g., a user may enter an identification number or other identifying feature to access the given record).

The access may also have a time aspect to be registered as a record access. In various embodiment, an access may have to occur for a predetermined amount of time to be recorded as a record access. In various embodiments, the length of the access may be based on the amount of time the given record is viewed by an end-point device associated with a user. The user may access a record (e.g., a decoy executed data transfer record) for a short amount of time accidentally and not indicate malfeasant behavior. As such, a record access may require at least a predetermined time of access. Additionally or alternatively, the record access may include the time of access for the given record. For example, the record access may include the amount of time and/or a timestamp for the access by the given user.

The monitor may be active (e.g., any access of a decoy executed data transfer may trigger an alert) or passive (e.g., periodic checks may be carried out to determine any record accesses of decoy executed data transfer records).

The record access may be in the form of an access log associated with each decoy executed data transfer records or executed data transfer record. For example, an access log for a given decoy executed data transfer records may be include information relating to any access by a user on the distributed network. The record access may also include information, such as the time of the access by the given user. The access log for one or more decoy executed data transfer records or executed data transfer record may be updated periodically. The access log for one or more decoy executed data transfer records or executed data transfer record may include additional information relating to the record access.

Record access may be made any time a user accesses a given decoy executed data transfer record or executed data transfer record. As such, a record access may be registered for any access of a record on the distributed network. In various embodiments, the access logs may be complied for one or more users. For example, any record access associated with a given user may be included in the given access log. In such an example, the system may use the access log to determine viewed records of the executed data transfer records that were accessed by a user that also viewed one or more decoy executed data transfer records.

In various embodiments, one or more action reports may be generated based on the viewed records. In such an embodiment, one or more viewed records may be listed for review for malfeasant activity. The action reports may be generated based on the access logs. In various embodiments, the action reports may also include additional information relating to the viewed records (e.g., length of access, time of access, etc.) and/or the one or more decoy executed data transfer record(s) viewed by the same user as the viewed records.

Referring now to optional Block 410 of FIG. 4A, the method includes determining one or more viewed records of at least one of the one or more executed data transfer records or one or more decoy executed data transfer records by the end-point device associated with the user. The system may determine one or more executed data transfer records that were accessed by a user that also accessed a decoy executed data transfer record. As such, any executed data transfer record may be vulnerable to an attack from the user. In such embodiments, increased monitoring and/or review of affected executed data transfer records may be completed to protect the distributed network. The user may also be limited and/or disallowed from accessing the distributed network. Therefore, the system allows for data transfers that were potential targets of malfeasant activity may be identified and/or malfeasant users may be prevented from carrying out new malfeasant attacks.

Referring now to optional Block 412 of FIG. 4A, the method includes causing the one or more viewed records to be marked as a potential target of malfeasance. A potential target of malfeasance may be any viewed record that was viewed by a user that also viewed a decoy executed data transfer record. For example, any executed data transfer record(s) that were viewed by a user that also viewed one or more decoy executed data transfer record, may be marked as a potential target of malfeasance. The executed data transfer record(s) that are marked as a potential target of malfeasance may be marked for investigation. In various embodiments, any executed data transfer record(s) marked as a potential target of malfeasance may be assumed to be malfeasant unless determined otherwise. In various embodiments, additional investigation may be completed upon determining potential target(s) of malfeasance. Additional investigation may be automated (e.g., the system may determine any actions relating to the given viewed record are malfeasant or otherwise abnormal) and/or manual (e.g., system administers may reviewed viewed record(s) for malfeasance and provide an input that indicates whether a potential target should remain as a potential target or cleared (e.g., a user may indicate a viewed record does not contain malfeasant activity and does not require any action)).

As discussed above in reference to Block 410, any viewed records may be potential targets of malfeasance, as a user that accessed a decoy executed data transfer record also viewed the executed data transfer record. In various embodiments, the user accessing the executed data transfer record(s) may not necessarily indicate malfeasant behavior. However, the system may identify potential target of malfeasance for additional investigation. For example, in an instance in which a data transfer associated with the viewed record is still in process, the system may monitor the data transfer for any malfeasance (e.g., unexpected activity or changes to the data transfer). In an instance in which a data transfer associated with the viewed record is already executed, the system may review the data transfer for any anomaly or other indicators of malfeasant activity.

Referring now to optional Block 414 of FIG. 4B, the method includes determining a malfeasant action has occurred on one or more of the one or more viewed records. As discussed above in reference to Block 412, the system may determine whether malfeasant activity has occurred. In some embodiments, malfeasant activity may be assumed for any viewed records (e.g., the system may assume that any viewed records may be a target of malfeasance). Additionally or alternatively, the system may conduct additional investigation on the viewed records to determine whether malfeasant actions were taken on the associated data transfers.

In various embodiments, the escalation action discussed below in reference to Block 420 may include a remediation action on one or more of the one or more viewed on which a malfeasant action has occurred. For example, a remediation action may include an alert, a data transfer reversal (e.g., retrieving the resource from the recipient and return to an original sender), and/or the like.

Referring now to optional Block 416 of FIG. 4B, the method includes determining a malfeasant intent for the user based on an interaction type for the record access. An interaction type may include the actions taken by the user during the record access. Example interaction types include the time of record access (e.g., the longer the time of record access, the more likely malfeasant activity is occurring), user engagement amount (e.g., the number of pages relating to the record viewed by the user), and/or the like. In various embodiments, the escalation action discussed below in reference to Block 422 of FIG. 4B, may be determined based on the malfeasant intent. For example, in an instance in which malfeasant intent is determined, the escalation action may be more severe (e.g., a user that has acted with malfeasant intent may be barred from the distributed network, while a user that is not determined to have acted with malfeasant intent may merely be limited in network access). In various embodiments, repeated record access by the same user of multiple decoy executed data transfer records may also indicate malfeasant intent.

Referring now to optional Block 418 of FIG. 4B, the method includes detecting a physical tampering of a server associated with the distributed network. In various embodiments, the server(s) associated with the distributed network may be capable of being quantum locked, such that in an instance in which the server(s) is physically tampered, the tampered server may experience quantum lock. In various embodiments, the distributed network may be distributed across multiple servers. As such, each of the servers may be capable of quantum locking.

Referring now to Block 420 of FIG. 4B, the method includes causing an escalation action to be executed based on the detection of the record access. In various embodiments, the escalation action may include limiting or completely eliminating access to the distributed network for the user. Such reduction or elimination of access may include viewing actions (e.g., the user may be limited in which records the given user can view) and/or other actions on the distributed network (e.g., the user may be limited in the type and/or amount of data transfers on the distributed networks).

The escalation may include one or more actions to remediate accessed data transfers associated with affected executed data transfer records (e.g., viewed records), prevent future malfeasant activity (e.g., via limiting user access and/or shutting down a network, and/or the like). In various embodiments, the escalation action may be related to the viewed records discussed herein. In various embodiments, the escalation action may be an action to remediate any viewed records that are potential and/or actual targets of malfeasant activity. The escalation action may include investigating and/or remediating a data transfer associated with a viewed record.

In various embodiments, the escalation action includes a shutdown of the distributed network in an instance in which the physical tampering is detected. The shutdown may be a partial and/or complete reduction in network capabilities. The shutdown may be temporary (e.g., a shutdown may be executed for a predetermined amount of time) and/or indefinite (e.g., the shutdown may be executed until the physical tampering can be investigated). The distributed network may also be partially and/or completely shutdown for other malfeasant activity (e.g., such as user(s) accessing one or more decoy executed data transfer records as discussed herein).

In various embodiments, the escalation action may include causing one or more data transfers on a distributed network to be denied in an instance in which at least one of physical tampering or a record access occurs. Pending data transfers may be denied and/or delayed for verification upon detection of physical tampering. For example, a review of one or more data transfers may be completed to ensure the data transfer was not subject to malfeasant activity. In various embodiments, physical tampering may cause the system to activate elevated security measures (e.g., multi-factor authentication and/or other elevated security measures).

In various embodiments, various other detection methods may be used to determine malfeasant activity. For example, the system may detect activity anomalies or analysis of user activity. The system may also perform root cause analysis for known malfeasant activity to improve detection of malfeasant activity. Other security methods may be used, such as incorporating hash functions (e.g., micro-hash functions) on the executed data transfer record(s) and/or the decoy executed data transfer record(s). Such security measures may be used in combination with the operations herein to determine the escalation action.

As will be appreciated by one of ordinary skill in the art, various embodiments of the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, micro-code, and the like), an entirely hardware embodiment, or an embodiment combining software and hardware aspects that may generally be referred to herein as a "system." Furthermore, embodiments of the present disclosure may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present disclosure, however, the computer-readable medium may be transitory, such as a propagation signal including computer-executable program code portions embodied therein.

It will also be understood that one or more computer-executable program code portions for carrying out the specialized operations of the present disclosure may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present disclosure are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present disclosure are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present disclosure.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications, and substitutions, in addition to those set forth in the above paragraphs, are possible. Those skilled in the art will appreciate that various adaptations and modifications of the just described embodiments can be configured without departing from the scope and spirit of the disclosure. Therefore, it is to be understood that, within the scope of the appended claims, the disclosure may be practiced other than as specifically described herein.

What is claimed is:

1. A system for determining and preventing malfeasant activity in a private distributed network, the system comprising:
    at least one non-transitory storage device containing instructions; and
    at least one processing device coupled to the at least one non-transitory storage device, wherein the at least one processing device, upon execution of the instructions, is configured to:
    generate one or more executed data transfer records for each of one or more executed data transfers across the private distributed network, wherein each of the one or more executed data transfer records comprises one or more data transfer information fields;
    generate one or more decoy executed data transfer records associated with one or more decoy data transfers, wherein the one or more decoy executed data transfer records comprises the one or more data transfer information fields;
    provide a portal that contains each of the one or more executed data transfer records and the one or more decoy executed data transfer records associated with the private distributed network;
    detect a record access for one or more of the decoy executed data transfer records by an end-point device associated with a user on the private distributed network;
    detect a physical tampering of a server associated with the private distributed network, wherein the escalation action comprises a shutdown of the private distributed network in an instance in which the physical tampering is detected; and
    cause an escalation action to be executed based on the detection of the record access, wherein the escalation action comprises limiting access to the private distributed network for the user.

2. The system of claim 1, wherein the at least one processing device, upon execution of the instructions, is configured to:
    determine one or more viewed records of at least one of the one or more executed data transfer records or one or more decoy executed data transfer records by the end-point device associated with the user; and
    cause the one or more viewed records to be marked as a potential target of malfeasance.

3. The system of claim 2, wherein the at least one processing device, upon execution of the instructions, is configured to determine a malfeasant action has occurred on one or more of the one or more viewed records, wherein the escalation action comprises a remediation action on the one or more of the one or more viewed on which a malfeasant action has occurred.

4. The system of claim 1, wherein the at least one processing device, upon execution of the instructions, is configured to:
    determine a malfeasant intent for the user based on an interaction type for the record access; and
    determine the escalation action based on the malfeasant intent.

5. The system of claim 1, wherein the escalation action comprises causing one or more data transfers on a distributed network to be denied in an instance in which at least one of physical tampering or a record access occurs.

6. The system of claim 1, wherein the private distributed network allows one or more entities can limit access to one or more users on the private distributed network.

7. A computer program product for determining and preventing malfeasant activity in a private distributed network, the computer program product comprising at least one non-transitory computer-readable medium having computer-readable program code portions embodied therein, the computer-readable program code portions comprising one or more executable portions configured to:
    generate one or more executed data transfer records for each of one or more executed data transfers across the private distributed network, wherein each of the one or more executed data transfer records comprises one or more data transfer information fields;
    generate one or more decoy executed data transfer records associated with one or more decoy data transfers, wherein the one or more decoy executed data transfer records comprises the one or more data transfer information fields;
    provide a portal that contains each of the one or more executed data transfer records and the one or more decoy executed data transfer records associated with the private distributed network;
    detect a record access for one or more of the decoy executed data transfer records by an end-point device associated with a user on the private distributed network;
    detect a physical tampering of a server associated with the private distributed network, wherein the escalation action comprises a shutdown of the private distributed network in an instance in which the physical tampering is detected; and cause an escalation action to be executed based on the detection of the record access, wherein the escalation action comprises limiting access to the private distributed network for the user.

8. The computer program product of claim 7, wherein the computer-readable program code portions comprising one or more executable portions are also configured to:
  determine one or more viewed records of at least one of the one or more executed data transfer records or one or more decoy executed data transfer records by the end-point device associated with the user; and
  cause the one or more viewed records to be marked as a potential target of malfeasance.

9. The computer program product of claim 8, wherein the computer-readable program code portions comprising one or more executable portions are also configured to determine a malfeasant action has occurred on one or more of the one or more viewed records, wherein the escalation action comprises a remediation action on the one or more of the one or more viewed on which a malfeasant action has occurred.

10. The computer program product of claim 7, wherein the computer-readable program code portions comprising one or more executable portions are also configured to:
  determine a malfeasant intent for the user based on an interaction type for the record access; and
  determine the escalation action based on the malfeasant intent.

11. The computer program product of claim 7, wherein the escalation action comprises causing one or more data transfers on a distributed network to be denied in an instance in which at least one of physical tampering or a record access occurs.

12. The computer program product of claim 7, wherein the private distributed network allows one or more entities can limit access to one or more users on the private distributed network.

13. A method for determining and preventing malfeasant activity in a private distributed network, the method comprising:
  generating one or more executed data transfer records for each of one or more executed data transfers across the private distributed network, wherein each of the one or more executed data transfer records comprises one or more data transfer information fields;
  generating one or more decoy executed data transfer records associated with one or more decoy data transfers, wherein the one or more decoy executed data transfer records comprises the one or more data transfer information fields;
  providing a portal that contains each of the one or more executed data transfer records and the one or more decoy executed data transfer records associated with the distributed network;
  detecting a record access for one or more of the decoy executed data transfer records by an end-point device associated with a user on the private distributed network;
  detecting a physical tampering of a server associated with the private distributed network, wherein the escalation action comprises a shutdown of the private distributed network in an instance in which the physical tampering is detected; and
  causing an escalation action to be executed based on the detection of the record access, wherein the escalation action comprises limiting access to the private distributed network for the user.

14. The method of claim 13, further comprising:
  determining one or more viewed records of at least one of the one or more executed data transfer records or one or more decoy executed data transfer records by the end-point device associated with the user;
  causing the one or more viewed records to be marked as a potential target of malfeasance; and
  determining a malfeasant action has occurred on one or more of the one or more viewed records, wherein the escalation action comprises a remediation action on the one or more of the one or more viewed on which a malfeasant action has occurred.

15. The method of claim 13, further comprising:
  determining a malfeasant intent for the user based on an interaction type for the record access; and
  determining the escalation action based on the malfeasant intent.

16. The method of claim 13, wherein the escalation action comprises causing one or more data transfers on a distributed network to be denied in an instance in which at least one of physical tampering or a record access occurs.

17. The method of claim 13, wherein the private distributed network allows one or more entities can limit access to one or more users on the private distributed network.

* * * * *